US009600273B2

(12) United States Patent
Neubeck et al.

(10) Patent No.: US 9,600,273 B2
(45) Date of Patent: Mar. 21, 2017

(54) EFFICIENT ANNOTATION SYSTEM FOR DISTRIBUTED VERSION CONTROL SYSTEMS

(71) Applicant: GOOGLE INC., Mountain View, CA (US)

(72) Inventors: Alexander Neubeck, Munich (DE); Evgeny Gryaznov, Munich (DE)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/572,463

(22) Filed: Dec. 16, 2014

(65) Prior Publication Data
US 2016/0170746 A1 Jun. 16, 2016

(51) Int. Cl.
*G06F 9/44* (2006.01)
(52) U.S. Cl.
CPC . *G06F 8/71* (2013.01); *G06F 8/73* (2013.01)
(58) Field of Classification Search
None
See application file for complete search history.

(56) References Cited

U.S. PATENT DOCUMENTS

| | | | | |
|---|---|---|---|---|
| 4,912,637 A * | 3/1990 | Sheedy | | G06F 8/71 |
| 6,757,893 B1 * | 6/2004 | Haikin | | G06F 8/71 717/170 |
| 7,757,219 B2 * | 7/2010 | Ball et al. | | 717/132 |
| 8,495,572 B2 * | 7/2013 | Bernin | | 717/122 |
| 8,719,239 B2 * | 5/2014 | Clemm et al. | | 707/695 |
| 2004/0216090 A1 * | 10/2004 | Kaler et al. | | 717/121 |
| 2008/0086718 A1 * | 4/2008 | Bostick et al. | | 717/120 |
| 2009/0133006 A1 * | 5/2009 | Cheung | | 717/144 |
| 2010/0050155 A1 * | 2/2010 | Iwama et al. | | 717/120 |
| 2011/0314006 A1 * | 12/2011 | Sweeney et al. | | 707/723 |
| 2012/0254219 A1 * | 10/2012 | Bell | | 707/766 |
| 2013/0174124 A1 * | 7/2013 | Watters et al. | | 717/122 |

OTHER PUBLICATIONS

Git-blame(1) Manual Page, Jul. 2012, version 1.7.11.1.*
Git-log(1) Manual Page, Jul. 2012, version 1.7.11.1.*
Ryen W. White et al., Exploring the Use of Labels to Shortcut Search Trails, Jul. 2010.*

(Continued)

*Primary Examiner* — Chat Do
*Assistant Examiner* — Douglas Slachta
(74) *Attorney, Agent, or Firm* — Birch, Stewart, Kolasch & Birch, LLP

(57) ABSTRACT

Systems and methods for making source code annotations available across software code repository commits are disclosed. An example method for creating an incremental blame structure for determining which annotations should be shown begins with receiving a commit including at least one file that has been updated with respect to a parent commit. Then, parent file revisions for the at least one file should be identified. An example method determines the differences between the at least one file and the identified parent file revisions and traces an origin of each line in the file based on the determined differences. An identifier of the line and the line's origin may be added to the incremental blame data structure of the file.

12 Claims, 21 Drawing Sheets

(56) References Cited

OTHER PUBLICATIONS

Boolean Operators "and", "or", and "not", May 2011, www.powergrep.com/manual/xmpboolean.html.*
Git-shortlog(1) Manual Page, Jul. 2012, version 1.7.11.2.*
Malek Trabelsi, How to Use Git Source Control with Xcode in iOS 6, Nov. 14, 2012.*
Why people should stop talking about git speed, May 12, 2009, https://cournape.wordpress.com/2009/05/12/why-people-should-stop-talking-about-git-speed/.*
Troy Hunt, The 10 commandments of good source control management, May 3, 2011, www.troyhunt.com/2011/05/10-commandments-of-good-source-control.html.*
Alex Blewitt, Git Tip of the Week: Assigning Blame, Jul. 12, 2011, http://alblue.bandlem.com/2011/07/git-tip-of-week-assigning-blame.html.*
Git-diff(1) Manual Page, Jul. 2012, version 1.7.11.2.*
Anonymous: "Svn blame (praise, annotate, ann)," Oct. 10, 2014, XP055221907, Retrieved from the Internet: URL: http://web.archive.org/web/20141010112026/ http:/svnbook.red-bean.com/en/1.7/svn.ref.svn.c.blame.html [retrieved on Oct. 19, 2015] whole document.
Anonymous: "TortoiseGit Manual: 2.32. Who Changed Which Line?", Oct. 16, 2014, XP055221927, retrieved from the Internet: URL: http://web.archive.org/web/20141016165055/ http://tortoisegit.org/docs/tortoisegit/tgit-dug-blame.html [retrieved on Oct. 19, 2015] whole document.
International Search Report and Written Opinion for Application No. PCT/US2015/045003 dated Nov. 10, 2015.

* cited by examiner

100

```
12  #include "strings/stringpiece_utils.h"  // for SplitAllowEmpty, ...
13  #include "strings/util.h"                //            for StringReplace
14
15  namespace myproject {
16
17  const int kNumFoldLines = 5;
18
19  // Returns the length of the indent of the given text.
20  // TODO (author) : Handle tabs (according to language)
21  int GetIndentLength(const StringPiece& str) {
```

101

103

FIG. 1 commit#1:

file#1
    1: aaa (from commit#1)
    2: bbb (from commit#1)
    3: ccc (from commit#1)

file#2
    1: aaa (from commit#1)
    2: aaa (from commit#1)

commit#2:

file#1
    1: bbb (from commit#1)
    2: cccc (from commit#2)
    3: ddd (from commit#2)

file#2

1: aaa (from commit#1)
    2: aaa (from commit#2)

3: aaa (from commit#1)
    4: bbb (from commit#2)

commit#3:

file #1

1: bbb (from commit#1)
    2: ccccc (from commit#3)
    3: ddd (from commit#3)
    4: eee (from commit#3)

file#2
    1: aaa (from commit#1)
    2: aaa (from commit#1)
    3: aaa (from commit#3)
    4: bbb (from commit#3)

commit#4:

parents are commit#2 and commit#3
    file#1
    1: bbb (from commit#1)
    2: cccc (from commit#2)
    3: ddd (from commit#2)
    4: eee (from commit#3)

file#2
    1: aaa (from line#1 of commit#1)
    2: aaa (from line#2 of commit#1)
    3: aaa (from line#3 of commit#1)
    4: bbb (from line#4 of commit#2)

FIG. 2

```
1: /* file hello.c */
2: #include stdio.h
3: main(){
```

FIG. 6a

```
1: /* file hello.c */
2: #include stdio.h
3: main(){
```

FIG. 6b

```
1: /* file hello.c */
2: #include stdio.h
3: main(){
-------------

```
commit#1:
    File #1
    1: aaa (A)
    2: bbb (A)
    3: ccc (A)

File #2
    1: aaa (A)
    2: aaa (A)
``` commit#2:

File #1
previous revision
1: aaa (A, b)
2: bbb(A)
3: ccc (A, b)

current content
1: bbb (A)
2: cccc (B)
3: ddd (B)

File #2
previous revision
1: aaa (A)
2: aaa (A)

current content
1: aaa (A)
2: aaa (B)
3: aaa (A)
4: bbb (B)

Commit 3

Commit 2

Commit 1

Commit 5

Commit 4

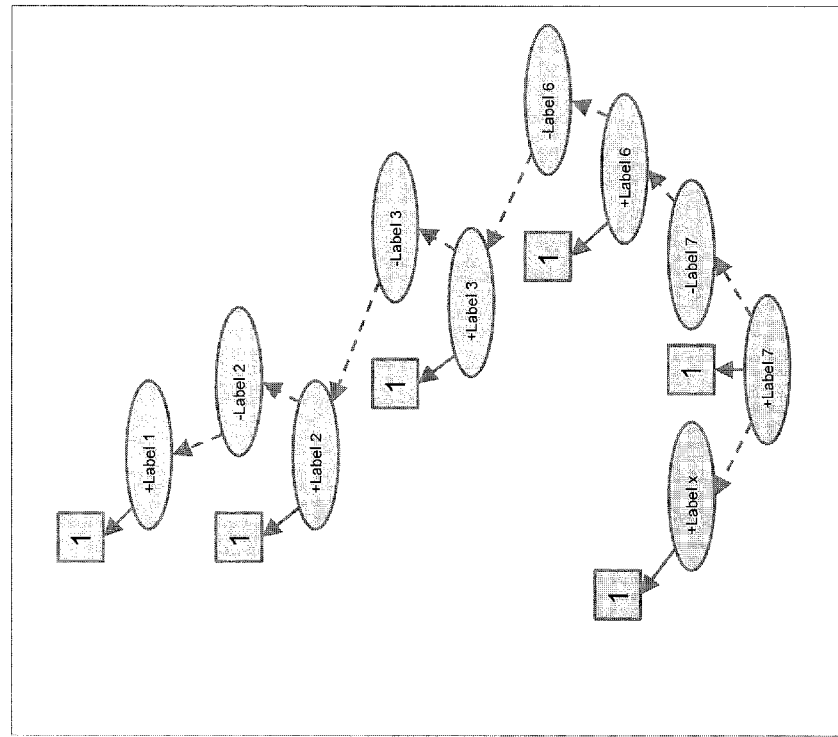
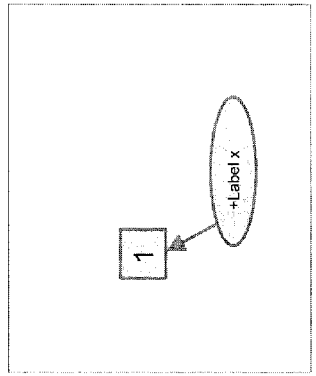
Compaction
FIG. 8g
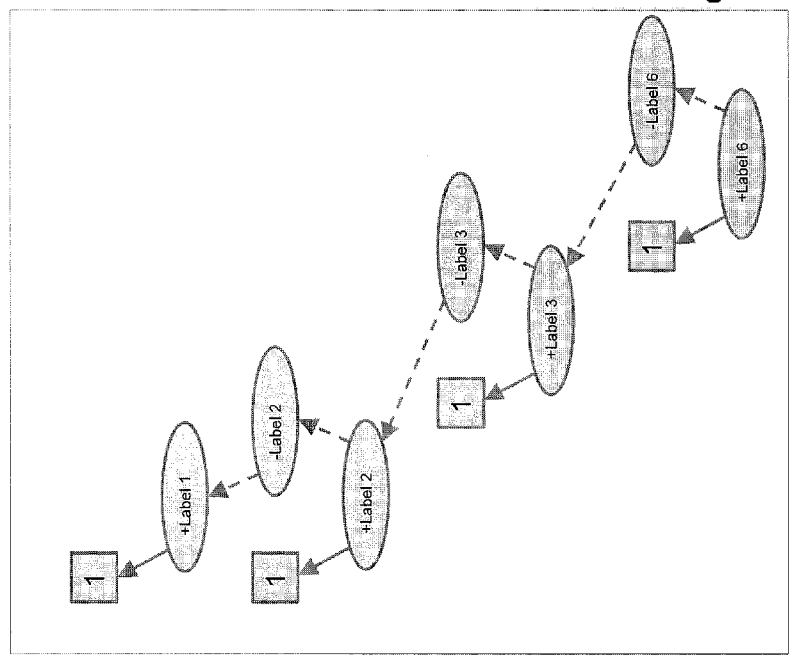
Commit 6
FIG. 8h
Commit 7
FIG. 8i

```
class Iterator {
public:
  Iterator(list<int>::iterator begin, list<int>::iterator end) : begin_(begin), end_(end), current_(0) {}
  int current() { return current_; }
  bool Advance(int doc_id) {
    while (true) {
      if (curr_ == end_) {
        current_ = MAX_INT;
        return false;
      }
      if (*curr_ >= doc_id) {
        current_ = *curr_;
        return true;
      }
      ++curr;
    }
  }
private:
  int current_;
  list<int>::iterator begin_, end_;
};
```

FIG. 10

```
// Helper struct representing which intervals should be processed by a specific node
struct S {
  S(Node* n, int b, int e) : node(n), begin(b), end(e) {}
  Node* node;
  int begin, end;  // [begin, end) is the doc ID range for which the current node can be
                   // reached in the BDD.
  bool operator<(const S& other) const {
    // define a total ordering for the struct.
    if (begin != other.begin)
      return begin < other.begin;
    if (end != other.end)
      return end < other.end;
    return node < other.node;
  }
};

class Node : public Iterator {
public: // somehow implements Iterator interface.

int prev = 0;
vector<Node*> children;  // initialized according to BDD structure
};

void FindAllMatchingDocs(Node* root, list<int>* matching_docs) {
  set<S> queue;
  queue.insert(S(root, 1, MAX_INT));
  int last_reported_doc = 0;  // used to report every matching document exactly once.
  while (!queue.empty()) {
    S s = *queue.begin();
    queue.erase(queue.begin());

s.begin = max(s.begin, last_reported_doc);
    if (s.begin >= s.end) continue;  // empty interval if (s.node->current() < s.begin) s.node->Advance(s.begin);
    if (s.node->current() == s.begin) {
      matching_docs.push_back(s.begin);
      last_matching_doc = s.begin;
    }
    for (Node* child : s.node->children)
      queue.insert(S(child, max(s.node->prev, s.begin), min(s.node->current(), s.end)));
    s.node->prev = min(s.node->current(), s.end);
    queue.insert(S(s.node, s.node->current(), s.end));
  }
}
```

FIG. 11

EFFICIENT ANNOTATION SYSTEM FOR DISTRIBUTED VERSION CONTROL SYSTEMS

BACKGROUND

When developing a software application, an individual software engineer often works on a specific feature of the software application. Once the feature is developed and tested, the source code containing the feature may be checked in and committed to the software application's code repository so that the feature can be shared with other software engineers working on the software application. To commit a feature to the code repository, a software engineer checks in all file changes and file additions necessary to make the feature functional on other machines. A commit to the software application's code repository may include only one file or may include a set of modifications made to specific source code files on a software engineer's individual machine that should be added to the code base held in the software application's code repository. Each commit is usually given an identifier. A specific commit, identified by its identifier, may provide a snapshot of a code repository at a given time. Each file within the commit may receive a file revision number that is associated with the commit. Software engineers may pull and accept updates from the code repository in order to obtain the latest commits containing the latest versions of files in the code repository and ensure that they are working on the current versions of source code files of the code base.

Within the software application development process, when viewing code, additional information related to the code may be relevant for understanding the code's purpose, functionality, or for finding a way to modify the code or fix broken code. Integrated development environments (IDEs) or text editors may display this additional information as annotations to the source code. For example, misspelled words may be highlighted, compiler errors may be shown next to the code that produced the errors, and a list of recent changes to a source code file or directory may be shown. Annotations may come from multiple sources, such as static code analysis, production systems, spell checkers, or collaboration tools. The tools that provide annotations operate on one specific file revision or commit. However, the generated annotations may remain relevant across file revisions or repository snapshots as long as subsequent code modifications in later commits do not render the annotations obsolete.

It would be advantageous for generated annotations to be made available across source code file revisions and code commits as long as they are useful for software engineers. As recognized by the inventors, there should be a way to generate and display annotations efficiently and correctly across software code commits in a source code repository.

SUMMARY

This specification describes technologies relating to displaying source code in general, and specifically to methods and systems for making source code annotations available across software code repository commits.

In general, one aspect of the subject matter described in this specification can be embodied in computer-implemented methods and systems. An example system includes one or more processing devices and one or more storage devices storing instructions that, when executed by the one or more processing devices, cause the one or more processing devices to implement an example method. An example method includes: receiving a commit including at least one file that has been updated with respect to a parent commit; identifying parent file revisions for the at least one file; determining the differences between the at least one file and the identified parent file revisions; tracing an origin of each line in the file based on the determined differences; responsive to determining that a line has been added or changed, marking the line as an origin and linking the line to itself in an incremental blame data structure for the file; and adding an identifier on the line and the line's origin to the incremental blame data structure of the file.

Another example method for displaying relevant annotation across multiple revisions of a file includes receiving a current revision of a file; querying a blame structure to obtain blame data associated with the file in order to determine visible lines in the current revision from a previous revision; determining annotations associated with the visible lines in the current revision from the previous revision; and displaying the determined annotations.

These and other embodiments can optionally include one or more of the following features. Tracing the origin of a line may include tracing parent file revisions associated with the line to one parent file revision and copying the origin information from the parent file revision to the line. Tracing the origin of a line may include tracing parent file revisions and associated with the line to multiple parent file revisions and copying the origin information from the parent file revision determined to be the oldest to the line in the incremental blame data structure. The parent file revision determined to be the oldest may be found based on a timestamp associated with the parent file revision. Responsive to determining that two lines in the at least one file contain the same origin, the latter of the two lines may be marked as a new origin line. Lines of the at least one file may be labeled as added lines and removed lines based on determined difference. A boolean query may be built to check whether a line is visible in a commit. There may be a determination to decide whether a boolean query becomes too complex (e.g. when it exceeds a predetermined length) and if so, the query may be replaced by a short-cut label to reduce query size and complexity. Alternatively, a binary decision diagram may be used instead of a boolean query and a label may be created for each commit. The binary decision diagrams may be evaluated from bottom to top following the edges to determine whether a line is visible in the commit.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1 is an example of annotations within source code.

FIG. 2 is an example of commits of source code.

FIG. 6a is an example of a parent commit of a file

FIG. 6b is an example of current code to be committed for the file represented in 5a.

FIG. 6c is an example of labeling a commit after determining the differences between the current state of the file as represented by 5b and a parent commit as represented by 5a.

FIG. 8g is an example of a major compaction.

FIG. 8h is an example binary description diagram for commit #6.

FIG. 8i is an example binary description diagram for commit #7.

FIG. 9b is an example of labels for the annotations shown in FIG. 9a.

FIG. 9c is an example reverse index for the commit graph shown in FIG. 9a.

FIG. 9d illustrates the positive labels with their corresponding documents of the annotations shown in FIG. 9a.

FIG. 10 illustrates an example iterator class.

FIG. 11 illustrates an example binary description diagram implementation for finding all matching documents.

DETAILED DESCRIPTION

As discussed above, annotations provide useful information about source code and should be available across commits as long as they are applicable to the current version of the file lines to which they were attached. Annotations can be added (or removed) from a specific line of code as appropriate. As illustrated in FIG. 1, an annotation (103) may alert a user to the fact that there is still a TODO in the code. However, customarily, it is difficult to determine whether an annotation is still applicable to a line of code when the line or file has been modified. Therefore, conventional systems do not retain annotations across file versions. An example system may allow annotations to be available across commits by providing a special data structure that stores annotations at blame layer. Additionally, a labeling scheme may be implemented on top of the example incremental blame data structure to enable searching and aggregation of annotations for specific commits.

When creating source code, software developers may perform several commits to a code repository. For example, as illustrated in FIG. 2, a root commit may include two files: File #1 and File #2. The content of File #1 from the root commit may include 'aaa' on line 1, bbb on line 2, and ccc on line 3. The content of File #2 from the root commit may include 'aaa' on line 1 and 'aaa' on line 2. A second commit may follow from commit #1 and change File #1 by deleting 'aaa,' changing 'ccc,' and adding 'ddd.' The content of File #1 may then be: 'bbb' on line 1 (from commit #1), 'cccc' on line 2 (from commit #2), and 'ddd' on line 3 (from commit #2). File #2 may be changed to include 'aaa' on line 1 (from commit #1), 'aaa' on line 2 (from commit #2), 'aaa' on line 3 (from commit #1), and 'bbb' on line 4 (from commit #1).

A third commit may follow from commit #1 and change File #1 by deleting 'aaa,' changing 'ccc,' adding 'ddd,' and adding 'eee.' The content of File #1 may be: 'bbb' on line 1 (from commit #1), 'ccccc' on line 2 (from commit #3), 'ddd' on line 3 (from commit #3), and 'eee' on line 4 (from commit #3). File #2 may be changed to include aaa on line 1 (from commit #1), aaa on line 2 (from commit #1), 'aaa' on line 3 (from commit #3), and 'bbb' on line 4 (from commit #3).

A fourth commit may be the child commit from both commit #2 and commit #3. File #1 may be merged by a user or a version control system. File #1 may include: 'bbb' on line 1 (from commit #1), 'cccc' (from commit #2, a user may resolve the conflicting line data by picking 'cccc' instead of 'ccccc'), ddd on line 3 (from commit #2), which causes blame conflict because the data could come from commit #2 or commit #3, and 'eee' on line 4 (from commit #3). File #2 may include: 'aaa' on line 1 (from line 1 of commit #1), 'aaa' on line 2 (from line 2 of commit #1), 'aaa' on line 3 (from line 3 of commit #3), and 'bbb' on line 4 (from line 3 of commit #2).

Figure 3:
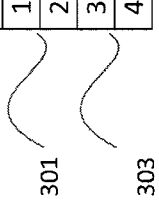
FIG. 3 is an example blame data structure for a file.

Blame data for a line of source code includes information identifying the commit at which the line was introduced or last modified. For example, in the example illustrated in FIG. 2 and discussed above, in commit #4, File #1 has content 'bbb' on line 1. This content was introduced into File #1 in commit #1, so the blame data for line 1 of File #1 includes a reference to line 2 of File #1 from commit #1. FIG. 3 shows an example blame data structure that includes a reference to Revision 1 (commit #1), line 2 as the representative line for line 1 (301).

An annotation may be created at a line or lines of a specific commit. Any information about the specific annotation, including attachments for the annotation, may be stored at blame layer in an example data structure for the annotation. Blame layer maps a line from one file revision to a line at an ancestor revision where it was first introduced. If the line is newly added, the blame layer maps the line to itself. This origin line (or lines) may correspond to different actual lines in subsequent revisions of the code. Therefore, annotations may be stored where the line was originally introduced. When the annotations of a file should be retrieved, an example system may lookup all the annotations stored at the lines referenced by the current file revision.

To create a quick lookup of annotations for lines in source code, pre-computed blame data should be acquired and stored in an example blame data structure. As stated above, this blame data structure is a map from actual lines to representative lines. Using a blame data structure, an example system may determine all representative lines of the file for which annotations should be shown. The annotations stored at these representative lines may then be found. In other words, a determination can be made whether to display the annotation in a specific version of the code based on the representative lines of a current file. Blame data may include data that shows the commit that is responsible for a specific change or revision to a line of a file. The incremental blame data structure may provide a fast representative line lookup to quickly determine the responsible commits for each line of the file. Any information about the annotation, including attachments for the annotation, may be stored at blame layer.

Figure 5A:
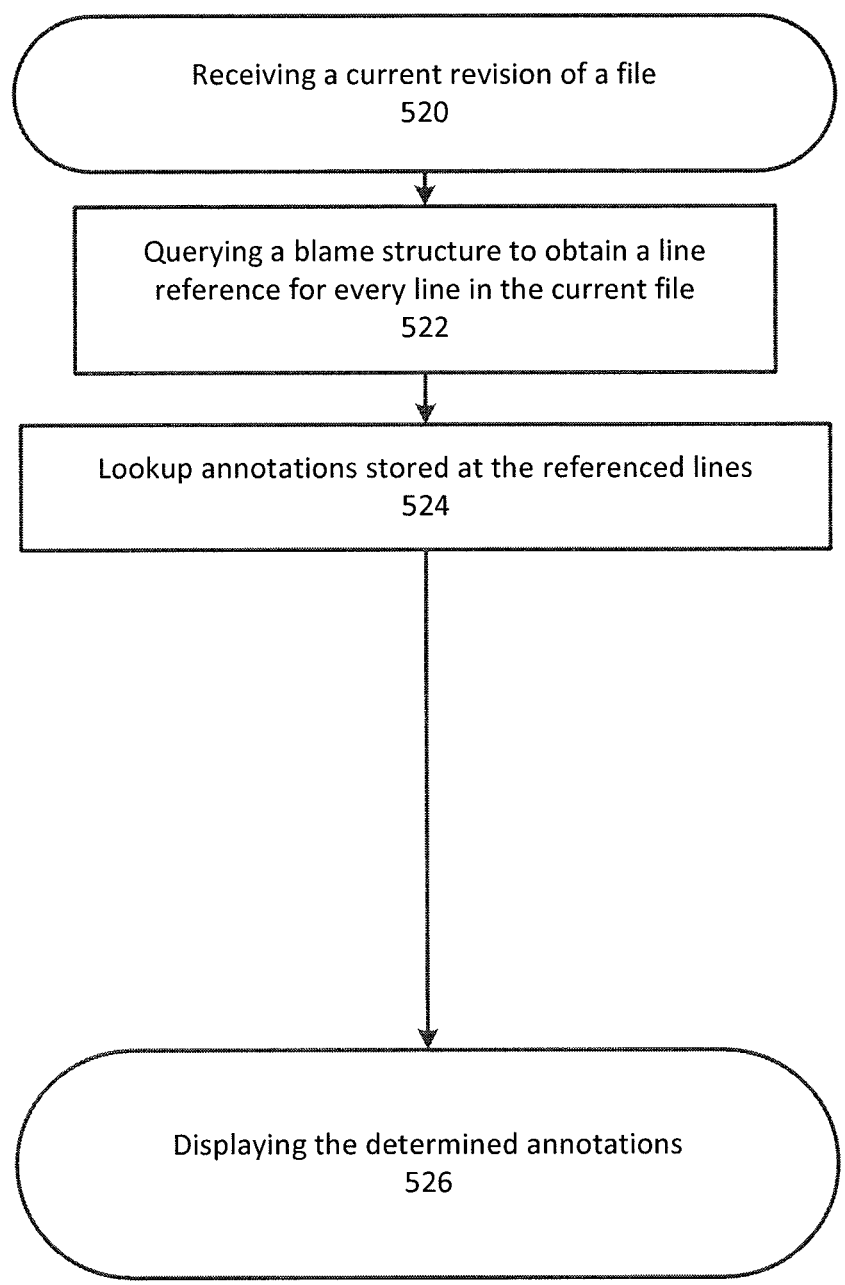
FIG. 5a is a flow diagram of an example method for displaying annotations across multiple revisions of a file.

An example method for displaying relevant annotations across multiple revisions of a file may begin with receiving a current revision of a file as illustrated in FIG. 5a (520). A blame structure associated with the file may be queried to obtain a line reference for every line in the current file (522). Then the method may lookup annotations stored at the referenced lines (524) and display the determined annotations (526).

Figure 4:
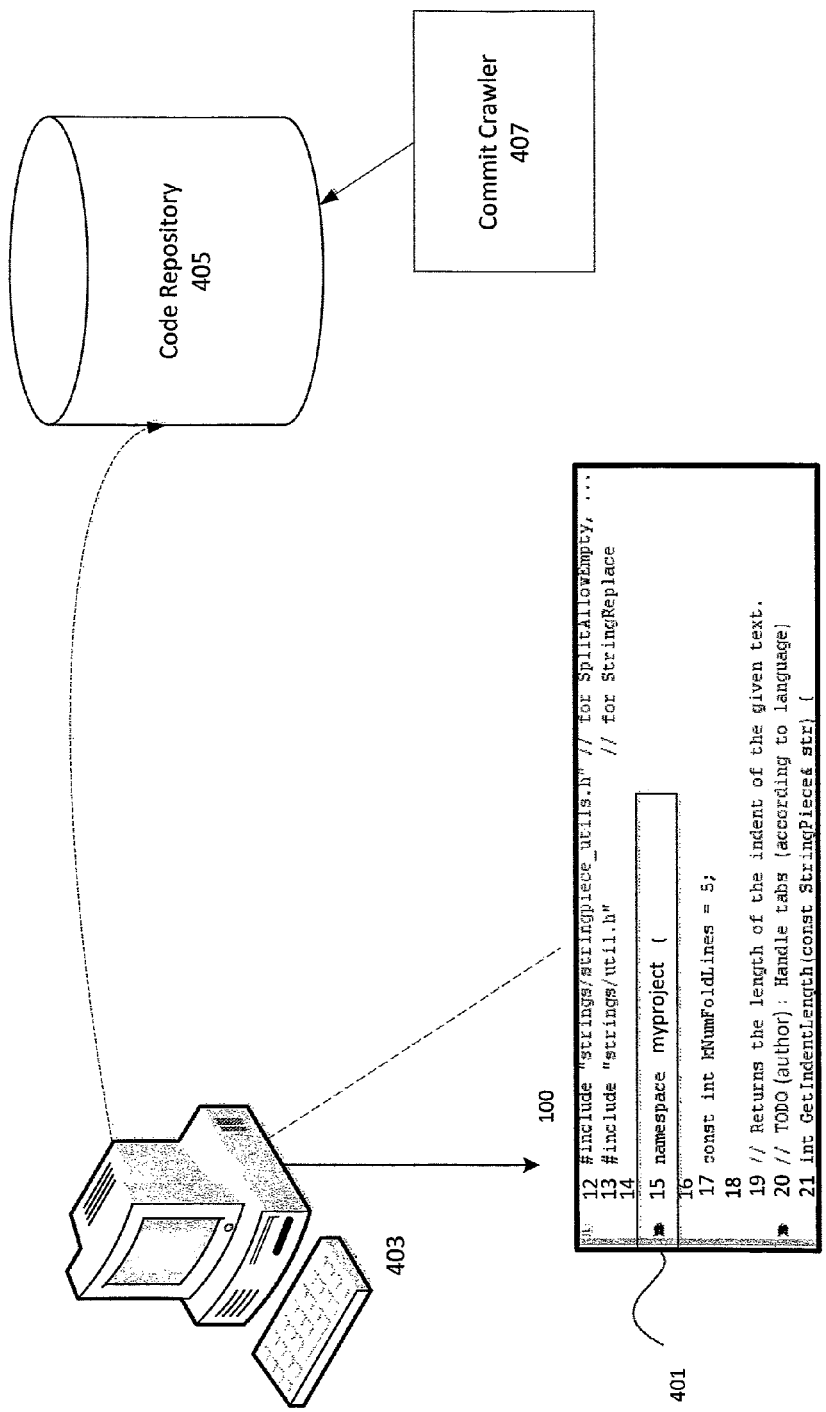
FIG. 4 is a block diagram illustrating an example check-in of a code change to the code repository.

In order to find all blame data, a straightforward solution may be to compute the blame information for all files visible at a particular commit. An example commit crawler (407) may be used to process commits one by one in order to determine the blame data for each file within the code repository of an application, as illustrated in FIG. 4. An example crawler (407) may connect with a code repository (405) using a post-receive hook or similar notification mechanism. When a commit occurs in the code repository (405), the commit crawler (407) may be notified via the post-receive hook or notification mechanism. The contents of the commit may then be fetched from the code repository by the commit crawler. The contents of the commit may include changes to files. For example, in FIG. 4, the file (100) originally illustrated in FIG. 1 has been changed to include an annotation on line 15 (401). Although annotations may come by means of static code analysis and/or directly from a repository change, annotations may come from other subsystems or deployed and executing programs whose sources may be stored in the repository.

The file in the commit (100) may be changed on a software engineer's local machine (403) and then committed to the code repository (405). When the file (100) is committed to the code repository (405), the commit crawler may run to determine the blame data that needs to be created. The commit crawler (407) may process commits in topological order so that parent commits come before children commits in order to create an example incremental blame data structure.

An example commit crawler (407) may create blame data for code files. Added files consist solely of new lines, each of which may be marked as origin lines. For example, if the file (100) from FIG. 1 was newly committed to the code repository (405), all lines would be marked as origin lines in revision 1.

Figure 5B:
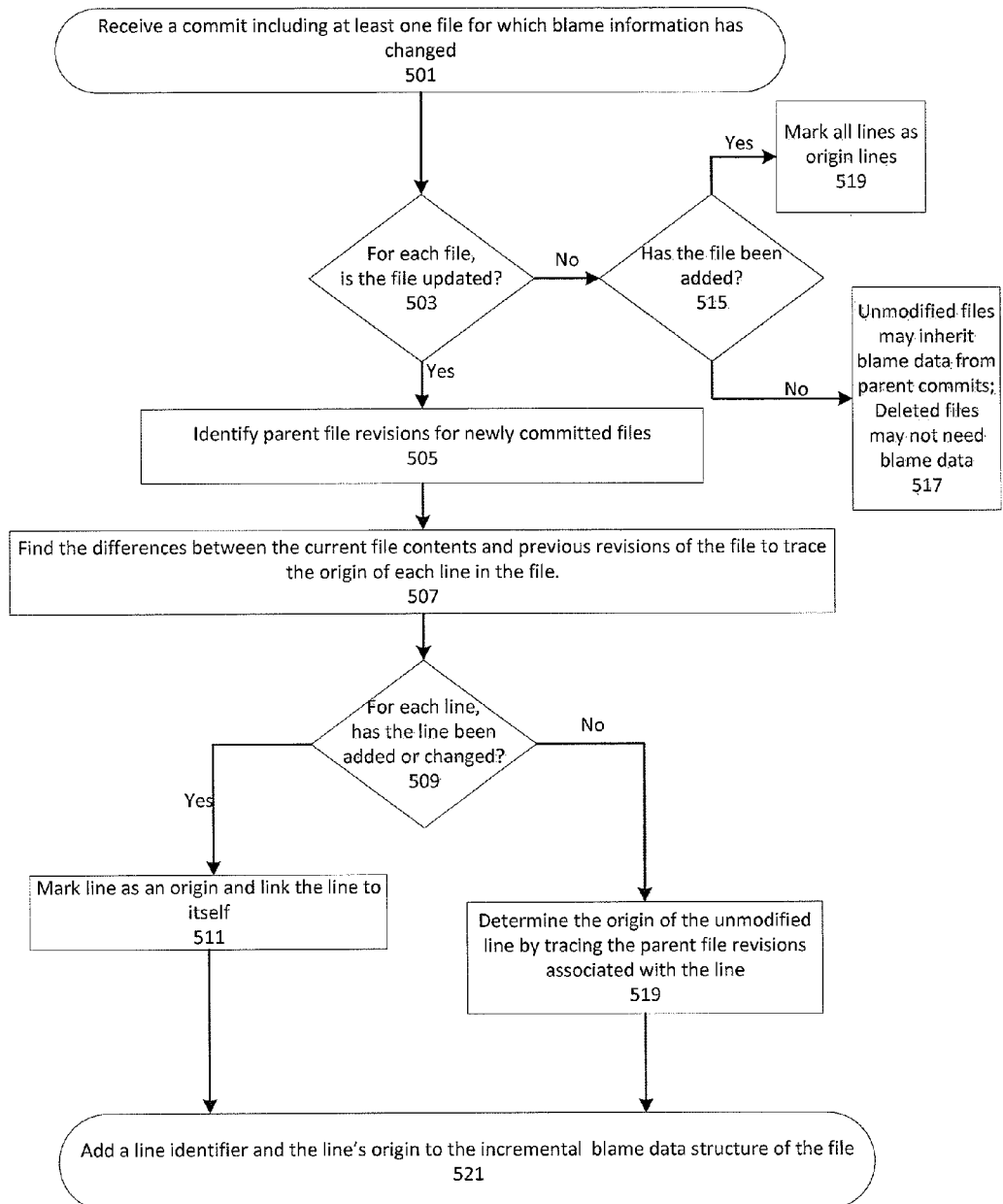
FIG. 5b is a flow diagram of an example method for creating an incremental blame data structure.

An example method for creating a blame data structure for a file begins with receiving at least one file as illustrated in FIG. 5 (501). An example method may determine whether the file has been modified (503). For a modified file, a commit crawler (407) may identify all parent file revisions (505) and find the differences between the current file contents and previous revisions of the file to trace the origin of each line in the file (507). For example, in the example illustrated in FIG. 2 and discussed above, in commit #4, File #1 has content 'ddd' on line 3. This content was introduced into File #1 in commit #2 on line 3, so the blame data for line 3 of File #1 includes a reference to line 3 of File #3 from commit #2. FIG. 3 shows an example blame data structure that includes a reference to Revision 2 (commit #2), line 3 as the representative line for line 3 (303).

In an example blame structure, changed and/or added lines may be marked as origins and linked to themselves. An example blame data structure maps from current, actual lines to their origin lines. Origin lines link to themselves. A reference to an origin line may be a tuple of file revision number and line number at the referenced revision. Therefore, in the blame data structure, as illustrated in FIG. 3, line 3 would be marked as an origin line in revision 2 (commit #2) for line 3.

As illustrated in FIG. 5, the origin of an unmodified line may be determined by tracing the parent file revisions associated with the line (517). A line identifier and the line's determined origin may be copied over from one of the parent revisions (519). The line identifier and the line's origin may then be added to the incremental blame data structure of the file (521).

Tracing the parent file revisions associated with a file line to determine the origin may be somewhat involved. If a line can be traced to just one parent file revision, the origin information from the parent file revision is copied to the line. If a line can be traced to multiple parent file revisions, there may be blame conflict.

Blame conflict may occur when there are two or more potential source lines to which a line could refer back. These potential source lines may come from different file revisions and, in the case of file moves, may even have different names. When a blame conflict occurs, the conflict may be resolved in favor of the oldest commit, based on timestamp, since this resolution should result in a large connectivity between branches. Another way to resolve conflict is to use the most recent commit, which may be determined based on commit timestamp. This method is the default in version control systems. Alternatively, the commit that comes first (or last) in a parent commit list may be chosen when resolving conflicts by using a parent identifier. Every commit (except the very first commit in a repository) has at least one parent commit. When a commit has multiple parents, a user may specify (either explicitly or implicitly) the order of the parent commits in a listing of the commits. The order may not change once it has been established.

An example of a blame conflict may be seen in FIG. 2, commit #4, line 3 of File #1. The content 'ddd' could come from commit #2 or commit #3. However, if blame data conflicts are resolved using the older commit in the case of conflicts, the content of commit #2 would be chosen.

In some embodiments, the content of a file may not change compared with a parent commit, but the associated blame information may differ from one commit to another. For example, in commit #4 of File #2 as illustrated in FIG. 2, the file content did not change from commit #3 and commit #2. However, the blame layer created for this commit is not simply a copy of either of the parent commits, commit #2 and commit #3. The content on line #3 of commit #4 is 'aaa' which could be from commit #1 or commit #3. Given the general rule from above that when blame conflict occurs, the conflict may be resolved in favor of the older commit, commit #1 should be chosen.

An example blame data structure may also (or alternatively) have a rule that the same line may not be chosen twice within the blame data structure. In this example, commit #1 is already used as the blame origin for line 1 and therefore should not be chosen for line 3. The limitation of a blame layer data structure not choosing the same line twice as a blame origin within the blame data structure may prevent an annotation from being displayed twice. If the same line was blamed (referenced) twice within a file, the line's associated annotations may only be counted once, but shown twice.

There also may be problems with lines in different files referencing the same representative line (which may happen when files are copied). For example, a file, f, may be copied from a first directory a/b to a second directory a/c, creating a second file g. Both files share the same representative lines (originating from file f). These two files may have identical blame data structures. If information, such as a log message, is added into file f, the information is stored at blame layer which is shared with file g. This blame layer line may be visible through file g. Additionally, if any information is added to file g, the information will be visible in file f. Assuming that files f and g are the only files in the directory and that there is a single annotation in file f, an example system would count one annotation for directory a/, one annotation for directory a/b/, and one annotation for directory a/c/. On a parent directory, such as a/, an annotation may only be shown once depending on the aggregation implementation, but two would be expected from a consistency point of view.

To find the oldest origin, an example commit crawler uses a timestamp of each commit (e.g. the timestamp when the commit was created in the distributed version control system) to determine the commit which is oldest in time. If two lines in the same file revision contain the same origin (which can happen after merges), the latter line is marked as a new origin line. Two lines from one commit, but different files may refer to the same origin after a copy or a move. In order to prevent two lines from having the same origin in this case, one of multiple approaches may be taken. For example, file moves may be ignored altogether. Another example is to find the differences between parent commits to see if the differences can bring inconsistencies into the index and maintain a set of used origins to avoid duplication. All referenced lines of files of one commit could be stored in one set in order to create a set of used origins. Then, a simple lookup may be done to determine whether a line is already referenced by another file. In order to determine origin lines for a large amount of files, a set implementation should be created that shares common data between commits. Persistent trees are one solution. Lines and their origins may then be added to the blame data structure of the file.

Although blame information can be computed for all files visible at a commit, there may be short-cuts available to save time and memory. For example, for every commit a mapping from filenames to a fingerprint of the corresponding blame information may be stored. Then, it is sufficient to recompute blame information only for those files which have different fingerprints in parent commits. Also, files which were only touched on one of the two branches may be excluded. Two files with the same content may have different blame information and thus the fingerprint over blame information is more distinct than the fingerprint over the file content. By using the fingerprint over blame information, files with unmodified content, but that have blame information which change may be quickly identified.

In an example embodiment, a labeling scheme may be used to quickly show all lines visible for a specific commit. One way to identify visible lines in a specific revision of a file is to mark all lines with all commit hashes (that identify the commits) where these lines are visible. Querying a set of visible lines may then be a simple filter by the commit hash value. However, there are problems with this approach, specifically memory consumption and crawling time. Every time a commit is crawled, all lines from the commit would need to be enumerated. This enumeration may include lines and files which were not modified. Instead, an example label scheme may be created that uses less memory and time to identify visible lines within a specific commit.

In an example label scheme for resolving conflicts by timestamp, every commit may get two unique labels: one for added lines (+L) and another for removed lines (−L). Labels may be created against one of the file's parent commits. For labeling purposes, changed lines may be considered removed and added lines. For example, as illustrated in FIGS. 6a-6c, FIG. 6a may represent a parent commit for a file. A subsequent commit may be entered for the file using the code of FIG. 6b. Comparing line 4 of FIGS. 6a and 6b, the print statement has changed from printing "hello world" to printing "hello you." As illustrated in FIG. 6c, this commit may result in two labels for line 4 of the committed file, a removed line (−L) label for removing the "hello world" printing and an added line label (+L) for adding the "hello you" printing. Labels may be attached to origin lines. It can be seen that every origin line contains one positive label of a commit where it was introduced and a set of negative labels of subsequent commits where it was deleted.

For every commit, a Boolean query expression may be built which checks whether a specific origin line belongs to the commit. The recursive formula may be: IsVisible(line, commit)=(IsVisible (line, first_parent(commit)) OR not −L(line, commit)) OR +L(line, commit). This formula takes all lines visible for the parent commit, excludes all removed lines in the current file revision, and includes lines newly added in the current file revision. This formula grows linearly with the depth of parent commits. If a commit does not use a label (e.g. no lines were added—there is no need in +L label), it may be omitted from the query. Queries may be stored as part of metadata for commits.

When resolving conflicts by timestamp, the recursive formula grows exponentially with the number of merges. For example, the recursive formula may be: IsVisible (line, commit)=((IsVisible(line, parent #1) OR IsVisible(line, parent #2) OR . . . OR IsVisible(line, parent #n)) && not −L(line, commit)) OR +L(line, commit), where n is the number of parents of the commit. The formula may be represented as a boolean graph which has common parts only once. This graph may grow linearly with the number of ancestor commits.

Figure 7A:
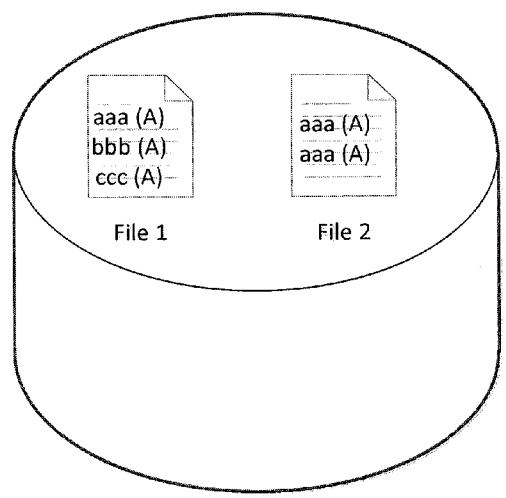
FIG. 7a is an example of labeling for commit #1 of FIG. 2.
Figure 7B:
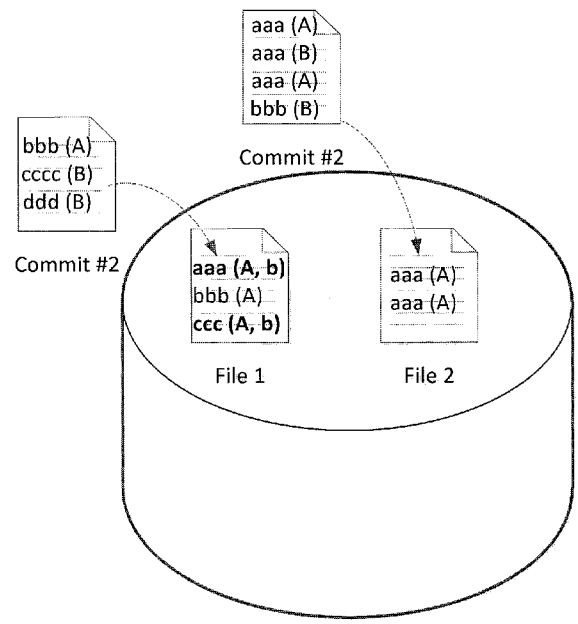
FIG. 7b is an example of labeling for commit #2 of FIG. 2.

FIGS. 7a-7d illustrate example labeling for the four commits of FIG. 2. Labels may be updated with every new commit using an example crawler. As shown in FIG. 7a, Commit #1 may get the positive label A and the negative label a. In this example, labels are enumerated in parentheses after line content. Capital letters denote positive labels and lower case letters denote negative labels. If a line is visible in the commit, the positive label may be used. If the line has been deleted, the negative label may be used. A modification may be represented as a deletion and then an add. Labeled data satisfying the following boolean query may be visible at commit #1: A In File #1, all lines may be labeled with the label (A) since all lines are added and visible in the root commit. All lines of File #2 may also be labeled with (A). Commit #2 may have the positive label B and the negative label b. Since the parent of commit #2 is commit #1, the query for commit #2 may extend the query of commit #1: (A AND (NOT b)) OR B. The labels for commit #1 may be changed based on the revisions in commit #2 as illustrated in FIG. 7b. Since line 1 of File #1 was deleted in commit #2, line 1 is labeled with A (visible in commit #1) and b (not visible in commit #2). Line 2 was unchanged so this line inherits the label of the origin line for line 2 of File #1. Only origin lines get labels. Non-origin lines may only show the labels of origin lines for illustration purposes. Those labels are shown underlined. Since line 2 of commit #2 is not an origin line, this line inherits its label from line 2 of commit #1 for File #1. Line 3 was modified. A modification may be treated as a delete and an add. Therefore, the new label for line 3 may be A, b (visible in commit #1, but not in commit #2). The new content may be labeled as follows: line 1 may be labeled with A since the line is from commit #1, line 2 may be labeled with B since this line was added in commit #2, line 3 may also be labeled with B since this line was also added in commit #2.

The label of File #2 at commit #1 may not change for commit #2. Labels of File #2 at commit #2 may be: line 1, A inherited from line 1 of commit #1 for File #2 since the line is from commit #1; line 2, B since the line is from commit #2, line 3 may be A inherited from line 3 of commit #1 since the origin line is from commit #1, and line 4 may be labeled with B since the line was added in commit #2.

Figure 7C:
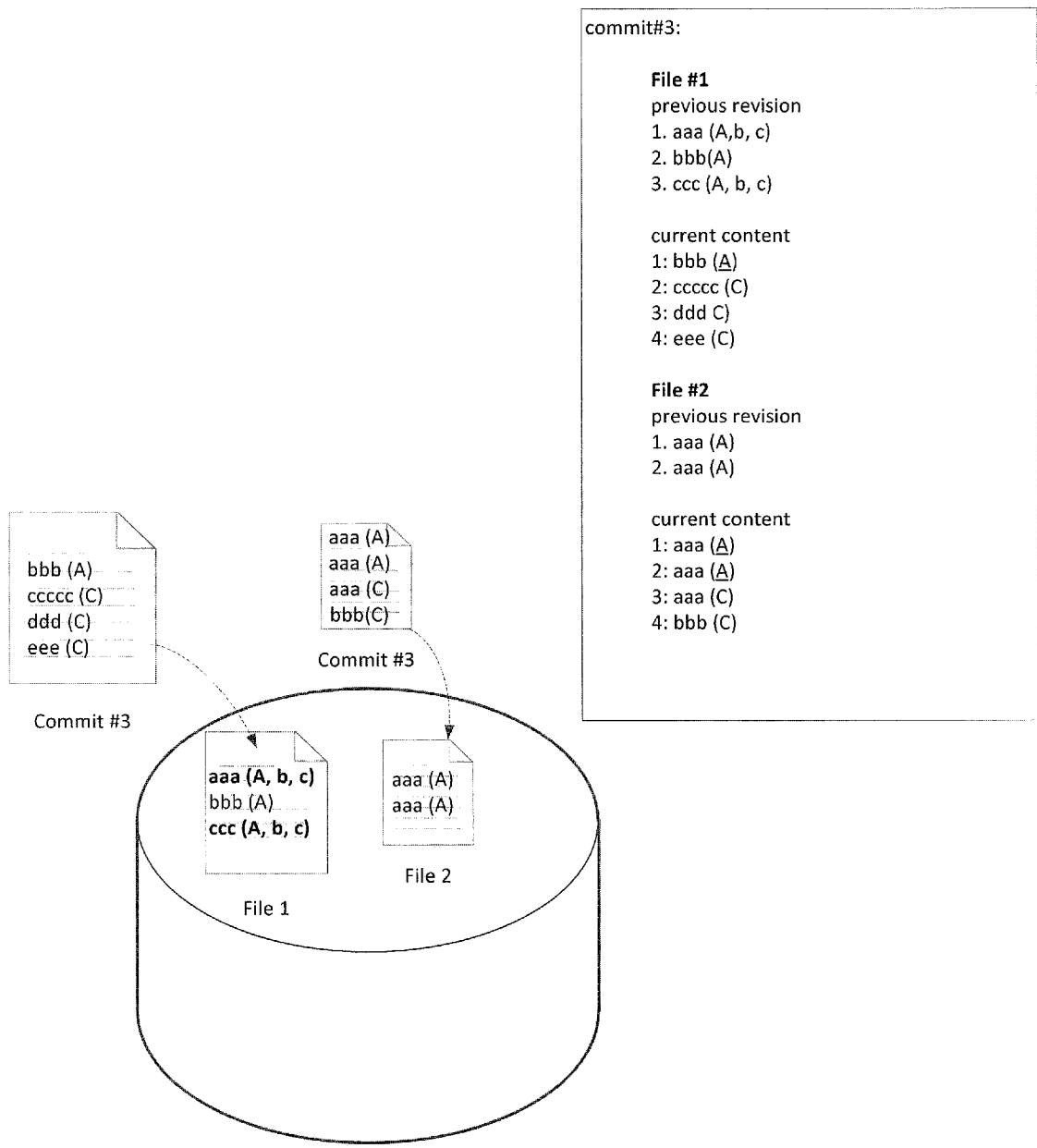
FIG. 7c is an example of labeling for commit #3 of FIG. 2.

Commit #3 may have the positive label C and the negative label c. Since the parent commit is commit #1, the query for commit #3 may extend the query for commit #1. (A AND (NOT c)) OR C. As illustrated in FIG. 7c, labels for the content of file #1 at commit #1 become: line 1, (A,b,c) since this line was deleted in commit #3 as well as commit #2; line 2, A, inherited from line 2 of commit #1; and line 3, (A,b,c) since this line was changed in commit #3 and a modification may be treated as a delete and add.

Labels for the content of file #1 at commit #3 may be: line 1, A inherited from line 1 of commit #1; line 2, C; line 3, C, and line 4, C. File #2 labeling at commit #1 may not change. However, the labels of file #2 at commit #3 may be: line 1, A, inherited from line #1 of commit #1; line 2, A, inherited from line 2 of commit #1; line 3, C; and line 4, C.

Figure 7D:
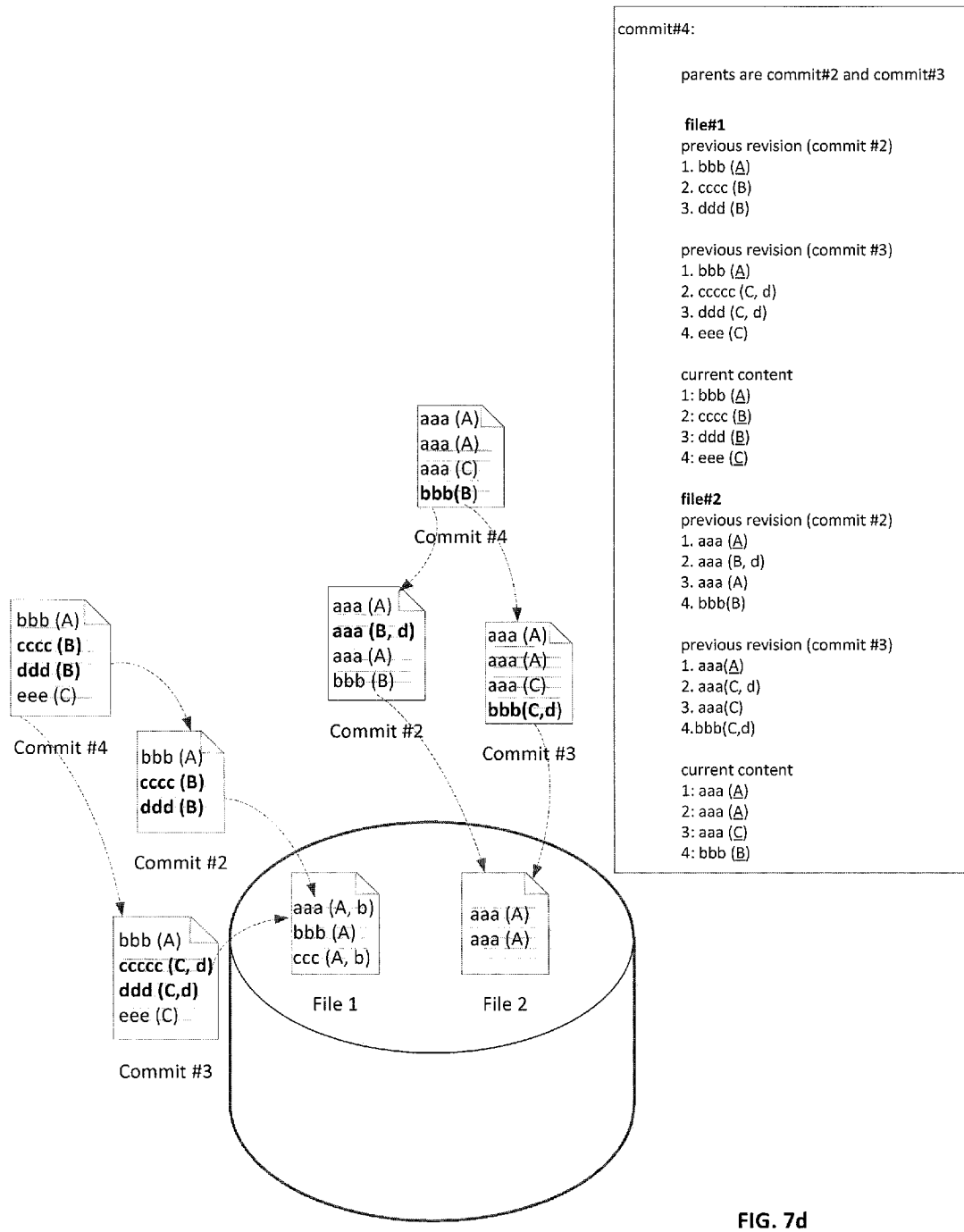
FIG. 7d is an example of labeling for commit #4 of FIG. 2.

Commit #4 may have the positive label D and the negative label d as shown in FIG. 7d. Commit #4 may have two parent commits (commit #2 and commit #3). Since there are two parent commits, the parent commit queries may be extended as follows:

1. (((A AND (NOT b)) OR B) AND (NOT d)) OR D
2. (((A AND (NOT c)) OR C) AND (NOT d)) OR D

Depending on the blame strategy, a different query may be used. In most cases, the two queries should be ORed. For example, after simplification: (((A AND (NOT b)) OR (A AND (NOT c)) OR B OR C) AND (NOT d)) OR D. Using a directed acyclic graph for expressing the query, the common part from commit #1 may be more easily reused. Labels for the content of File #1 at commit #1 may not change. Labels for the content of File #1 at commit #3 may be: line 1, A, inherited from line 1 of commit #1; line 2, C,d; line 3, C,d; line 4, C inherited from line 4 of commit #3 as shown in FIG. 7d (previous revision (commit #3) file #1). Labels for the content of File #1 at commit #2 may be unchanged. The labels for the current content of File #1 at commit #4 may be: line 1, A, inherited from line 1 of commit #1; line 2, B, inherited from line 2 of commit #2; line 3, B inherited from line 3 of commit #2; and line 4, C, inherited from line 4 of commit #3. Labels for File #2 at commit #1 are unchanged. However, the labels of File #2 at commit #2 become: line 1, A, inherited from line 1 of commit #1; line 2, B,d; line 3, A, inherited from line 2 of commit #1; and line 4, B inherited from line 4 of commit #2. Labels for File #2 at commit #3 become: line 1, A, inherited from line 1 of commit #1; line 2, A, inherited from line 2 of commit #1; line 3, C inherited from line 3 of commit #3; and line 4, C, d. Finally, the labels of File #2 at commit #4 are: line 1, A, inherited from line 1 of commit #1; line 2, A, inherited from line 2 of commit #1; line 3, C, inherited from line 3 of commit #3; and line 4, B, inherited from line 4 of commit #1. All lines for commit #4 are from other commits and therefore the labels are not stored in commit #4.

To make queries more efficient, an example labeling scheme may occasionally perform major compactions, which create shortcut labels. Major compactions may occur when the query length reaches a specified size or meets certain other criteria. These criteria may be evaluated during crawling. When the criteria are satisfied, a shortcut label may be stored for a query so that the shortcut label may be used in subsequent commits. Files which satisfy the original query may be updated with the corresponding shortcut label.

This re-labeling may affect many files from various commits. Therefore, re-labeling may be done asynchronously to crawling. New commits which use the shortcut label may not work until the asynchronous re-labeling is finished. Therefore, both the long query and the short query may be propagated to commits. The short query version may be kept and the tuples of scheduled queries may be tracked. If a query should be evaluated and it uses one of the not-yet-finished replacement labels, the query may be expanded by replacing the replacement label with the corresponding query.

A major compaction may include the process of finding all queries longer than a predefined length and building a set of queries that should be replaced with new labels. For every query of the set, matching origin lines are enumerated and a replacement label is appended to them. Replacement labels may be introduced when the compaction process is triggered and be used in subsequent query constructions. This compaction process may be scheduled by the commit crawler when the crawler encounters a commit with a long query. An advantage of this procedure is that the compaction is deterministic and a recrawl will create the same shortcuts.

An example labeling scheme may additionally or alternatively reserve shortcut labels in advance of using them to reduce query length. Shortcut labels may be given to child commits. Only one child may be able to inherit a reserved shortcut label from the same parent. Such labels may aggregate change along their propagation path and may be used to shorten the query. This approach may reduce the order of query growth from linear to logarithmic.

An example of labeling is illustrated in FIG. 8. In FIG. 8a, a commit graph with Commit 1 as the root commit is displayed. There are several other commits that are children and descendants of Commit 1. Each commit begins with its own label and its own binary decision diagram. FIG. 8b illustrates the binary decision diagram (BDD) for Commit 1. This BDD may be used for querying annotations which match Commit 1. BDDs may be evaluated from bottom to top following the edges. When a label is present, the solid arrow may be followed. When a label is absent, the dashed label may be followed. An example method may only be interested in matches (i.e. 1s) so the 0 labels may be skipped. FIGS. 8c-8e illustrate the binary decision diagrams for Commits 2-4. For Commit 5 (as illustrated in FIG. 8f), the BDDs from Commit 4 and Commit 3 may be merged by simply reusing already existing nodes. Every label exists once at most in the graph and therefore it is trivial to merge the BDDs. In this BDD there may be a non-determinism, i.e. follow both edges. The BDD matches when there exists a path that reaches a 1. From "−Label 5" to "+Label 3" there is a dashed line on the graph. However, by following this path, a 1 can be reached. The BDD for commit may become too big as determined by the query length. When this happens, a unique label, such as "x," may be introduced which can be used instead of the current labels for Commit 5. This unique label is illustrated in FIG. 8g. FIG. 8h illustrates the labeling for Commit 6. FIG. 8i illustrates the labeling for Commit 7. In Commit 7, the shortcut label x may be used instead of the original BDD for Commit 5.

Figure 8A:
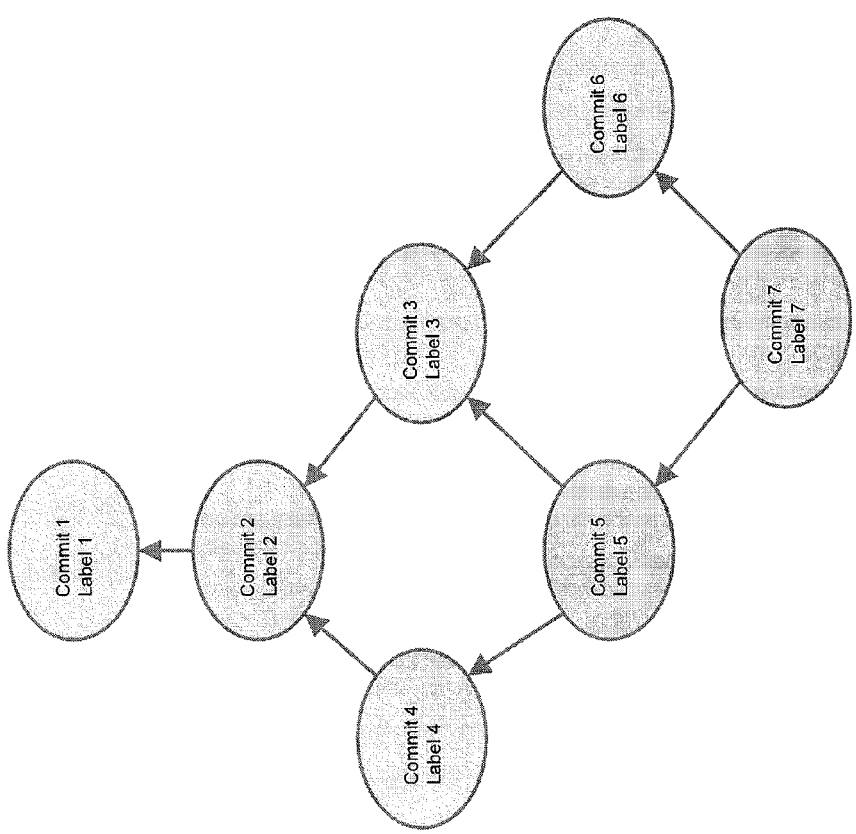
FIG. 8a is an example commit graph.
Figure 8D:
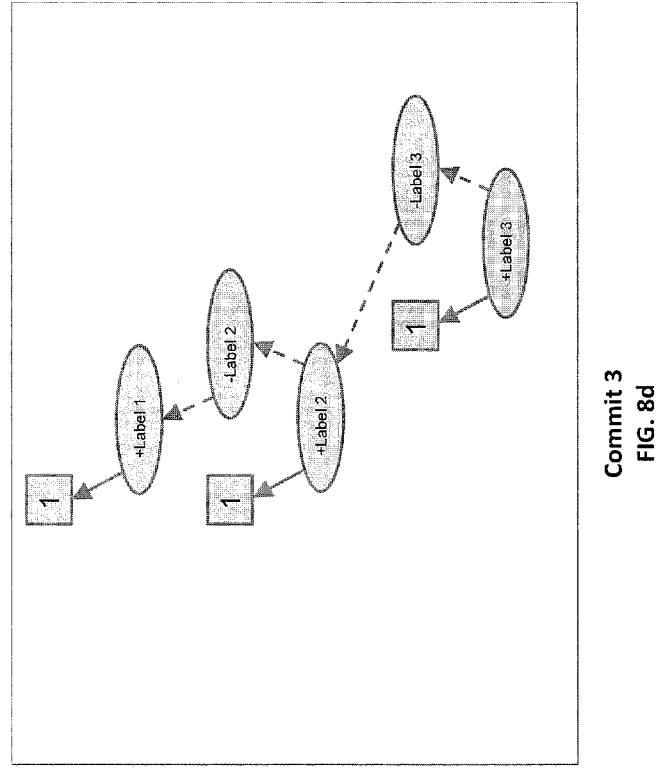
FIG. 8d is an example binary description diagram for commit #3.
Figure 8C:
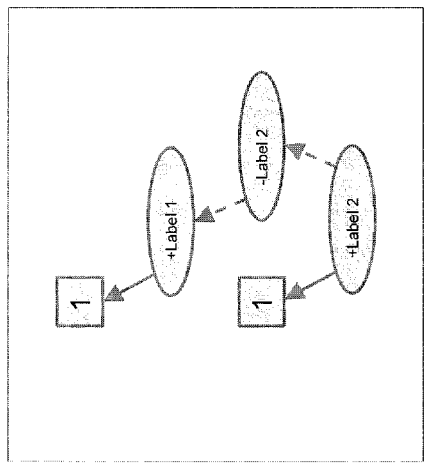
FIG. 8c is an example binary description diagram for commit #2.
Figure 8B:
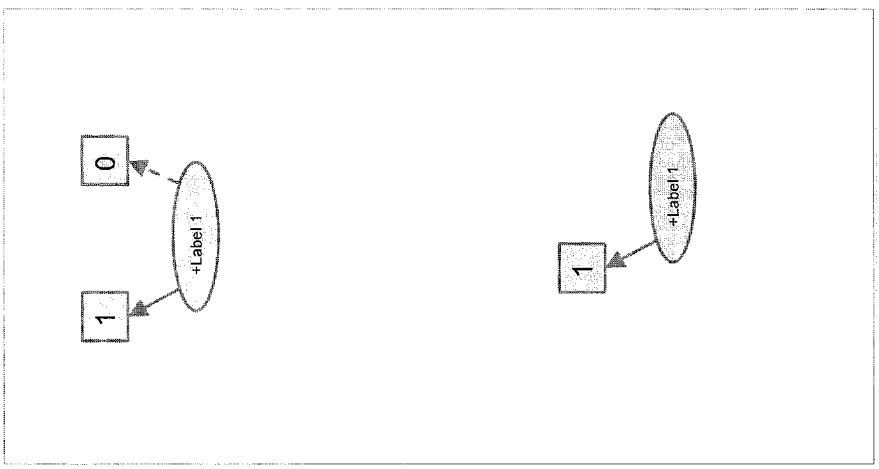
FIG. 8b is an example binary description diagram for commit #1.
Figure 8F:
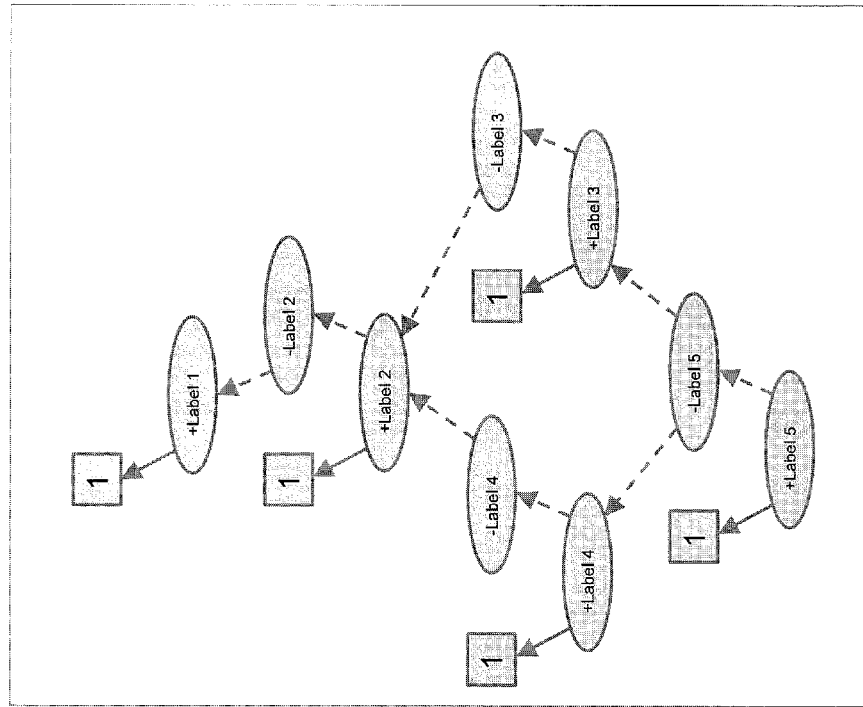
FIG. 8f is an example binary description diagram for commit #5.
Figure 8E:
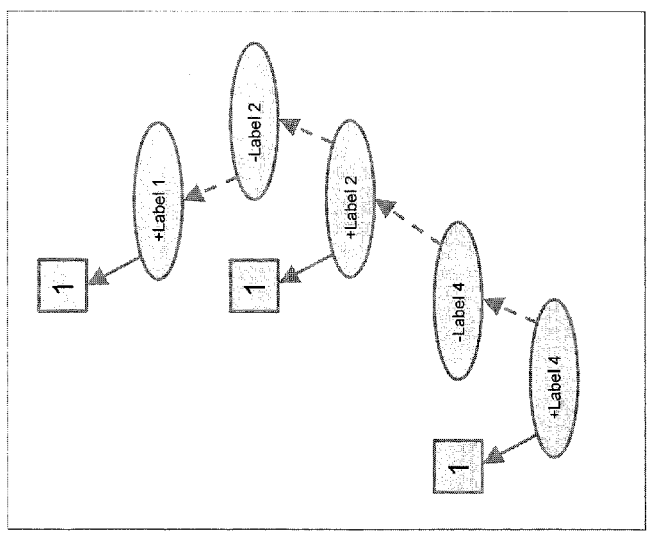
FIG. 8e is an example binary description diagram for commit #4.
Figure 9A:
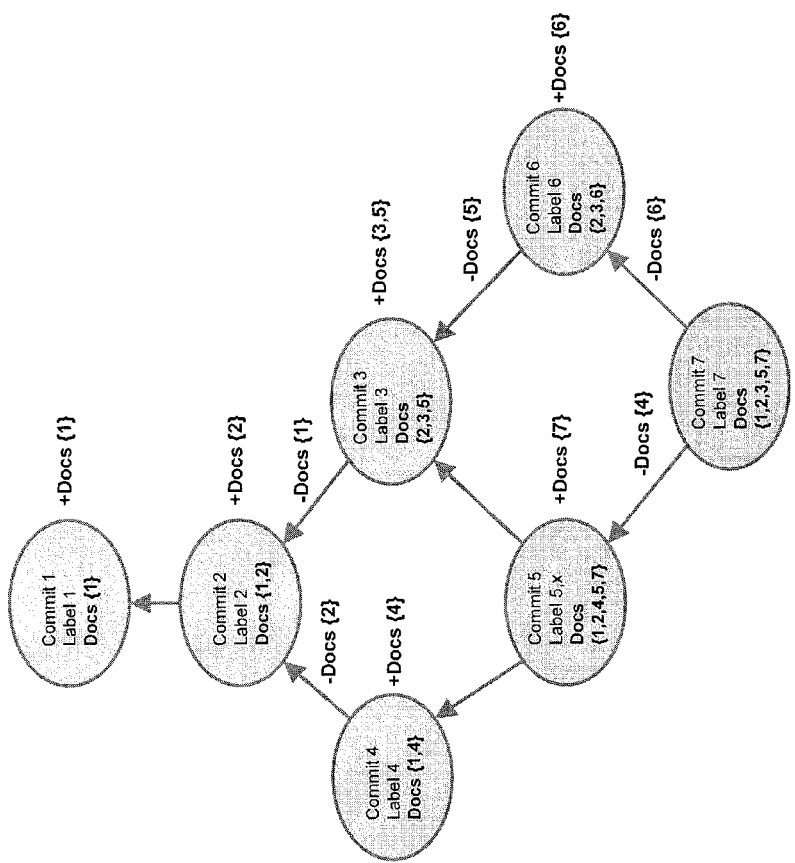
FIG. 9a is an example commit graph with annotations.
Figure 9D:
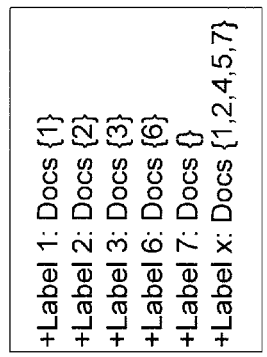
Figure 9B:
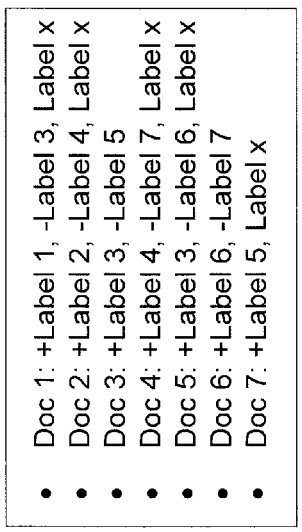
Figure 9C:
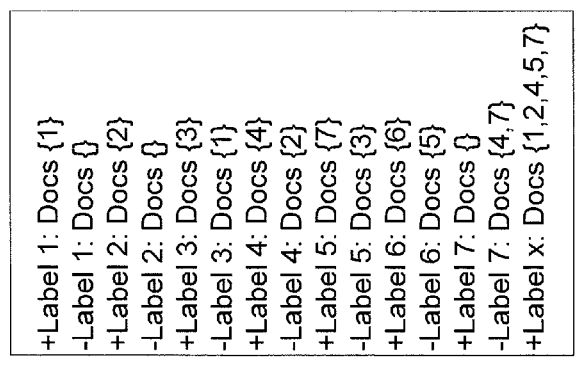

FIG. 9a illustrates the same example as FIG. 8a, but with annotations (in this example, Docs). Every commit shows the set of annotations which are visible at that commit. Next to every commit the annotations that have been added to that commit are labeled (merely for example purposes). For example, at Commit 2, an annotation for Doc 2 has been added. Next to every edge the annotations that have been removed between the connected commits are labeled (merely for example purposes). For example, between Commit 2 and Commit 3, the annotation for Doc 1 has been removed. In this example, the annotations may be labeled as shown in FIG. 9b. FIG. 9c illustrates an example reverse index that may be created for the annotations shown in FIG. 9a. A search index may create the reverse index that for every label stores a sorted list of documents which match the label. An example search may retrieve all documents that have +labels of a query. For these documents, the binary decision diagram may be evaluated. For example, using commit 7 of FIG. 8i, the positive labels with their corresponding documents may be the labels illustrated in FIG. 9d. The union of these sets may be {1, 2, 3, 4, 5, 6, 7} and the binary decision diagrams of each document may be evaluated.

For every label, a search backend may provide an iterator which iterates through the documents matching each label in order. The search backend may store a document identifier to which the iterator is currently pointing and may provide an advance function which takes a document identifier as input and moves the iterator to the next document in the set that is not smaller than the provided document identifier. If the next document identifier is smaller or equal to the current document identifier, the search backend may do nothing. A simple example implementation of the iterator class is illustrated in FIG. 10. FIG. 11 illustrates an example binary decision diagram implementation for finding all matching documents based on iterators.

An example label scheme may have the following properties: the number of label changes may be on the order of the number of differences between the current file and its previous revisions; the number of labels at any line may be in the order of the number of commits touching a particular line as well as the short-cut labels associated with the line; and querying to determine if a line is visible at a commit may be constant after every major compaction, but may grow linearly or logarithmically with the number of incoming commits depending on the commit graph structure since the last major compaction.

The example incremental blame data structure and the labeling scheme are useful tools when determining which annotations should be displayed in an integrated development environment (IDE) at a given time for a given file revision. As discussed above, annotations may come from multiple sources, such as static code analysis, production systems, spell checkers, or collaboration tools and may provide additional information related to the code that may be relevant for understanding the code's purpose, functionality, or for finding a way to modify the code or fix broken code.

Figure 12:
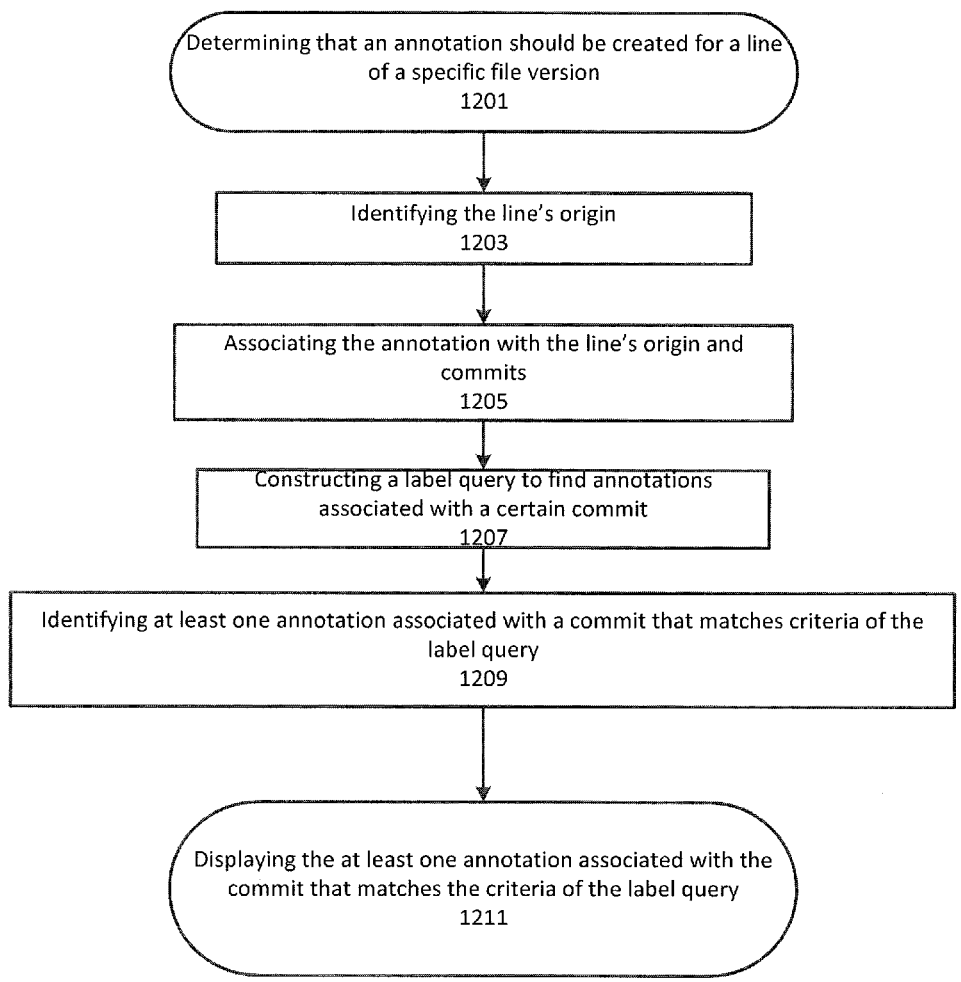
FIG. 12 is a flow diagram of an example method for displaying annotations across source code file revisions.

When an annotation should be created for a line of a specific file version, the line origin may be found in an example blame structure and the annotation may be associated with the line origin as illustrated in FIG. 12 (1201-1205). The annotation may also receive a unique identifier which allows for quickly updating the annotation. An example identifier may be any kind of fingerprint in order to achieve a random distribution of annotations in the integer space. The identifier may be used for sampling the solution space during aggregation.

In order to make annotations searchable, annotations may be placed into a search backend such as a database, hash table, or other storage mechanism. Each annotation may inherit all commit labels from the origin line to which it is associated (1205). When an IDE or some other display mechanism needs to determine when to display an annotation, a label query may be constructed to find all annotations associated with a specific commit via a commit label (1207). Other filters may be added to the query. For example, searches may be restricted to a specific type of annotation. A label query may be constructed to display aggregations or summaries regarding annotations, i.e. how many annotations of a certain type exist at a given commit. All annotations associated with a certain commit may be identified by using the label query to find the annotations with matching commit labels to the label query (1209). Only annotations with matching commit labels to the label query criteria may be displayed (1211). When the labels of an origin line change, the associated annotations may need to be updated with the new label information.

Fast aggregation of annotations may be achieved by sampling using the random fingerprint in the annotation space until enough results have been found to show the required result precision to the user. For example, if all data is on a single machine, the documents may be iterated in hash order until a specific number of results have been found, such as 1000 results. The total number of results may then be estimated by dividing the number of found results, 1000 in this example, by the portion of the hash space that was searched.

The data may be distributed on multiple machines and each machine may be responsible for a closed interval of the hash space. A simple procedure may be applied. For example, if there are 100 machines, every machine may look for 10 results. Each machine may return the number of results found and the size of the searched hash space. The results from each machine may be summed together and an estimate may be calculated. If the total number of results is considerably less than the specified number, for example, if 1000 results should be found, but only 100 were found, the estimate may be imprecise. In order to achieve a more precise estimate, the procedure may be started again with more results being requested per machine. Depending on the search backend, the aggregated values may be returned instead of the individual annotations at every layer of the search backend.

This aggregation also allows for tracking annotations that come from a particular tool which are run for arbitrary versions. Instead of simply creating a new annotation, an example method may determine if an annotation already exists from a previous run at the origin line. If an annotation does exist, the existing annotation is simply reused and potentially appended with additional data from the new run.

If a tool produces many annotations, another set of labels, tool labels, may be provided for every annotation and an example method may determine if the tool was executed. The tool may then only report the differences between the new execution and the previous execution. Every annotation that is not part of the new execution may be marked with the (−L) label of the corresponding execution (or commit if there is only one execution per commit) and every annotation which is new may be marked with the (+L) label. The (tool_label, tool_query) pair for the new execution may be constructed from the previous execution in the same way as construction of the (label, query) pair for commits works (based on one parent commit). Searching for the annotations of an execution may include simply searching for a specific (tool_label, tool_query) pair on the new label set of the annotations. Searching for annotations of a specific execution at another commit may simply be restricting the search with the (tool_label, tool_query) pair of the corresponding execution and the (label, query) pair of the commit at which the annotations should be searched. This type of searching may be useful because tools may cover some commits, but not all, and an example embodiment may want to display the closest results to an uncovered commit. A second (tool_label, tool_query) pair may come from executions that define a linear graph or directed acyclical graph which is structurally similar to the commit graph.

The proposed index may enable efficient computation of intersections, differences, and unions of annotations between commits and/or executions. In case of software development, these kinds of computations may be helpful when analyzing production issues. For example, an annotation may be added for every log output occurring during a deployment. These annotations may automatically show up on a development branch where the software engineer tries to fix the issue. Additionally, statistics may be available regarding the number of log statements on a project or the difference of occurrences between two deployments.

Another use case may be code reviews where for certain snapshots tools identify potential programming bugs. With the example system, annotations can be efficiently made visible at later snapshots where the tool wasn't yet run. Also, these annotations can be followed over time for the full repository efficiently in order to give some indication about the code health. Annotations may only be visible for later commits and not previous versions. Annotations may be marked as resolved for later commits. Annotations may be tracked even when a line has been modified or deleted. For example user comments should not disappear without user interaction.

Figure 13:
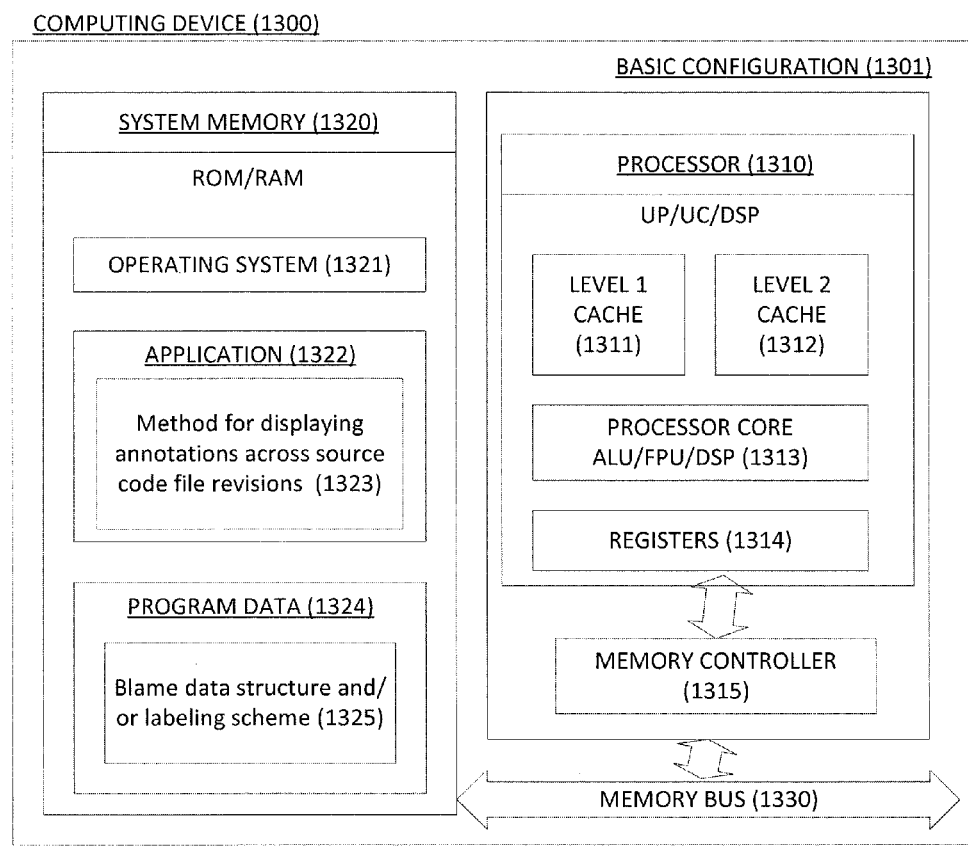
FIG. 13 is a block diagram illustrating an example computing device.

FIG. 13 is a high-level block diagram of an exemplary computer (1300) that is arranged for displaying annotations across source code file revisions. In a very basic configuration (1301), the computing device (1300) typically includes one or more processors (1310) and system memory (1320). A memory bus (1330) can be used for communicating between the processor (1310) and the system memory (1320).

Depending on the desired configuration, the processor (1310) can be of any type including but not limited to a microprocessor (P), a microcontroller (μC), a digital signal processor (DSP), or any combination thereof. The processor (1310) can include one more levels of caching, such as a level one cache (1311) and a level two cache (1312), a processor core (1313), and registers (1314). The processor core (1313) can include an arithmetic logic unit (ALU), a floating point unit (FPU), a digital signal processing core (DSP Core), or any combination thereof. A memory controller (1316) can also be used with the processor (1310), or in some implementations the memory controller (1315) can be an internal part of the processor (1310).

Depending on the desired configuration, the system memory (1320) can be of any type including but not limited to volatile memory (such as RAM), non-volatile memory (such as ROM, flash memory, etc.) or any combination thereof. System memory (1320) typically includes an operating system (1321), one or more applications (1322), and program data (1324). The application (1322) may include a system for displaying annotations across source code file revisions. Program Data (1324) includes storing instructions that, when executed by the one or more processing devices, implement a system and method for creating an incremental blame data structure and/or a labeling scheme. (1323). In some embodiments, the application (1322) can be arranged to operate with program data (1324) on an operating system (1321).

The computing device (1300) can have additional features or functionality, and additional interfaces to facilitate communications between the basic configuration (1301) and any required devices and interfaces.

System memory (1320) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media can be part of the device (1300).

The computing device (1300) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1300) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for creating an incremental blame data structure for a file, the method comprising:
    receiving a source code commit that includes at least one file that has been updated with respect to a parent commit, and at least one annotation associated with a particular line in the at least one file, the annotation indicating an error related to the source code on the particular line;
    identifying parent file revisions for the at least one file;
    determining the differences between the at least one file and the identified parent file revisions;
    labeling lines of the at least one file as added lines and removed lines based on the determined differences;
    building a boolean query which checks whether a line is visible in the commit;
    creating a binary decision diagram and label for each commit;
    evaluating the binary decision diagrams from bottom to top following the edges to determine whether a line is visible in the commit;
    tracing a line origin, which includes a revision number and line number responsible for the current state of the line, of each line in the file based on the determined differences;
    responsive to determining that a line has been added or changed, marking the line as an origin and linking the line to itself in an incremental blame data structure for the file;
    responsive to determining that a line has not been updated, determining an origin of the unmodified line by tracing the parent file revisions associated with the unmodified line; and
    adding an identifier of the line, the line's origin, and any annotation associated with the line's origin to the incremental blame data structure of the file.

2. The computer-implemented method of claim 1, wherein tracing the origin of a line includes tracing parent file revisions associated with the line to one parent file revision and copying the origin information from the parent file revision to the line.

3. The computer-implemented method of claim 1, further comprising:
    determining whether the boolean query is longer than a predetermined length; and
    responsive to determining that the boolean query is longer than a predetermined length, substituting the query with at least one new label.

4. The computer-implemented method of claim 1, wherein tracing the origin of a line includes tracing parent file revisions associated with the line to multiple parent file revisions and copying the origin information from the parent file revision determined to be the oldest to the line in the incremental blame data structure.

5. The computer-implemented method of claim 4, wherein the parent file revision determined to be the oldest is found based on a timestamp associated with the parent file revision.

6. The computer-implemented method of claim 4, further comprising:
    responsive to determining that two lines in the at least one file contain the same origin, marking a latter line of the two lines as a new origin line.

7. A system for creating an incremental blame data structure for a file, the system comprising:
    one or more processing devices; and
    one or more storage devices storing instructions that, when executed by the one or more processing devices, cause the one or more processing devices to:
    receive a source code commit that includes at least one file that has been updated with respect to a parent commit, and at least one annotation associated with a particular line in the at least one file, the annotation indicating an error related to the source code on the particular line;
    identify parent file revisions for the at least one file;
    determine the differences between the at least one file and the identified parent file revisions;
    labeling lines of the at least one file as added lines and removed lines based on the determined differences;
    building a boolean query which checks whether a line is visible in the commit;
    creating a binary decision diagram and label for each commit;
    evaluating the binary decision diagrams from bottom to top following the edges to determine whether a line is visible in the commit;
    trace a line origin, which includes a revision number and line number responsible for the current state of the line, of each line in the file based on the determined differences;
    responsive to determining that a line has been added or changed, mark the line as an origin and linking the line to itself in an incremental blame data structure for the file;
    responsive to determining that a line has not been updated, determine an origin of the unmodified line by tracing the parent file revisions associated with the unmodified line; and
    add an identifier of the line, the line's origin, and any annotation associated with the lines origin to the incremental blame data structure of the file.

8. The system of claim 7, wherein tracing the origin of a line includes tracing parent file revisions associated with the line to one parent file revision and copying the origin information from the parent file revision to the line.

9. The computer-implemented method of claim 7, further comprising:
    determining whether the boolean query is longer than a predetermined length; and
    responsive to determining that the boolean query is longer than a predetermined length, substituting the query with at least one new label.

10. The system of claim 7, wherein tracing the origin of a line includes tracing parent file revisions associated with the line to multiple parent file revisions and copying the origin information from the parent file revision determined to be the oldest to the line in the incremental blame data structure.

11. The system of claim 10, wherein the parent file revision determined to be the oldest is found based on a timestamp associated with the parent file revision.

12. The computer-implemented method of claim 10, further comprising:
- responsive to determining that two lines in the at least one file contain the same origin, marking a latter line of the two lines as a new origin line.

* * * * *